United States Patent
Ikemoto (10) Patent No.: US 9,807,297 B2
(45) Date of Patent: Oct. 31, 2017

(54) DEPTH DETECTION APPARATUS, IMAGING APPARATUS AND DEPTH DETECTION METHOD

(71) Applicant: CANON KABUSHIKI KAISHA, Tokyo (JP)

(72) Inventor: Kiyokatsu Ikemoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/292,158

(22) Filed: Oct. 13, 2016

(65) Prior Publication Data
US 2017/0126955 A1    May 4, 2017

(30) Foreign Application Priority Data
Oct. 30, 2015   (JP) .................. 2015-214737

(51) Int. Cl.
| | | |
|---|---|---|
| H04N 5/228 | (2006.01) | |
| H04N 5/232 | (2006.01) | |
| G02B 7/34 | (2006.01) | |
| G06T 5/00 | (2006.01) | |
| G06T 5/20 | (2006.01) | |
| G06T 7/00 | (2017.01) | |

(52) U.S. Cl.
CPC .......... *H04N 5/23212* (2013.01); *G02B 7/34* (2013.01); *G06T 5/006* (2013.01); *G06T 5/20* (2013.01); *G06T 7/0065* (2013.01)

(58) Field of Classification Search
None
See application file for complete search history.

(56) References Cited

U.S. PATENT DOCUMENTS

| | | |
|---|---|---|
| 8,872,962 B2 | 10/2014 | Fukuda |
| 2013/0113987 A1 | 5/2013 | Fukuda |

FOREIGN PATENT DOCUMENTS

| | | |
|---|---|---|
| JP | 5606208 B2 | 10/2014 |

*Primary Examiner* — Stephen Coleman
(74) *Attorney, Agent, or Firm* — Fitzpatrick, Cella, Harper & Scinto (57) ABSTRACT

Provided is a depth detection apparatus having: a shift amount acquisition unit to acquire a provisional image shift amount; a filter processing unit to perform filter processing on one or both of the first and second signal; and a depth deriving unit to derive the depth information on an object, based on a positional shift amount between the filtered first signal and the filtered second signal. A phase term of the filter is a function generated by a second function by a coefficient, wherein the second function is generated based on a phase transfer function corresponding to the first or second pupil region and on the provisional image shift amount, and the coefficient is a real number greater than 0 and smaller than 1.

14 Claims, 7 Drawing Sheets

DEPTH DETECTION APPARATUS, IMAGING APPARATUS AND DEPTH DETECTION METHOD

BACKGROUND OF THE INVENTION

Field of the Invention

The present invention relates to a depth detection apparatus, an imaging apparatus, and a depth detection method.

Description of the Related Art

As a depth detection technique that can be applied to a digital camera, a depth detection technique providing a depth measuring function to a part or all of the pixels of image pickup elements, and detecting the depth to an object based on the phase contrast method, is known. The pixel having a depth measuring function (hereafter called "depth measuring pixel") has a plurality of photoelectric conversion units which receive luminous flux that passed through different regions on a pupil of the imaging optical system respectively. The shift amount of an image signal generated by each photoelectric conversion unit is estimated, and the depth is measured by converting the shift amount into a defocus amount using a conversion coefficient.

One factor that drops the depth measuring accuracy is a change in the profile of the image signal generated by each photoelectric conversion unit. If the image signal generated by each photoelectric conversion unit has a different profile from each other, due to the eclipse of luminous flux caused by a frame of the optical system or the like, and has a difference in sensitivity characteristic among the pixels, the accuracy to estimate the shift amount of the image signal drops, and the depth measuring accuracy drops accordingly.

Japanese Patent No. 5606208 discloses a method for correcting the profile difference by filtering the image signals so as to improve the shift amount detection accuracy. The profile difference among the image signals changes in accordance with the defocus amount. Therefore according to Japanese Patent No. 5606208, the shift amount is provisionally calculated using the image signal before correction (hereafter called "provisional image shift amount"), whereby an approximate value of the defocus amount is detected, and the image profile is corrected using a filter generated based on this result.

Patent Document 1: Japanese Patent No. 5606208

SUMMARY OF THE INVENTION

The provisional image shift amount normally includes an error, hence the image profile cannot be completely recovered even if the image profile is corrected using the filter based on the provisional image shift amount. If the defocus amount (depth to an object) is large, the image profile correction effect simply drops even if a degree of error is included in the provisional image shift amount. However, if the defocus amount is small, the influence of the error included in the provisional image shift amount becomes more serious, and in some cases the profile difference in the corrected signal may become greater than the profile difference among the original image signals, and the depth measuring accuracy may drop.

With the foregoing in view, it is an object of the present invention to provide a depth detection apparatus and a depth detection method with which depth can be measured at high precision.

A first aspect of the present invention is a depth detection apparatus for detecting depth information on an object, based on a first signal corresponding to a luminous flux that has passed through a first pupil region of an exit pupil of an imaging optical system, and a second signal corresponding to a luminous flux that has passed through a second pupil region, which is different from the first pupil region, this depth detection apparatus having: a shift amount calculation unit configured to calculate a provisional image shift amount, which is an amount of positional shift between the first signal and the second signal; a filter processing unit configured to perform filter processing for one or both of the first signal and the second signal, using a filter generated based on the provisional image shift amount; and a depth deriving unit configured to derive the depth information on an object, based on a positional shift amount between the first signal on which the filter processing has been performed and the second signal on which the filter processing has been performed, or a positional shift amount between one signal on which the filter processing has been performed and another signal on which the filter processing has not been performed. A phase term of the filter is a function generated by multiplying a function based on a phase transfer function corresponding to the first pupil region or the second pupil region and on the provisional image shift amount, by a coefficient, which is a real number greater than 0 and smaller than 1.

A second aspect of the present invention is a depth detection method for a depth detection apparatus to detect depth information on an object, based on a first signal corresponding to a luminous flux that has passed through a first pupil region of an exit pupil of an imaging optical system, and a second signal corresponding to a luminous flux that has passed through a second pupil region, which is different from the first pupil region, this method including: a provisional image shift amount calculation step of calculating a provisional image shift amount, which is an amount of positional shift between the first signal and the second signal; a filter processing step of performing filter processing on one or both of the first signal and the second signal using a filter generated based on the provisional image shift amount; and a depth deriving step of deriving the depth information on an object based on a positional shift amount between the first signal on which the filter processing has been performed and the second signal on which the filter processing has been performed, or a positional shift amount between one signal on which the filter processing has been performed and another signal on which the filter processing has not been performed. A phase term of the filter is a function generated by multiplying a function based on a phase transfer function corresponding to the first pupil region or the second pupil region and the provisional image shift amount, by a coefficient which is a real number greater than 0 and smaller than 1.

According to the present invention, a depth detection apparatus and a depth detection method with which depth can be measured at high precision can be provided.

Further features of the present invention will become apparent from the following description of exemplary embodiments with reference to the attached drawings.

DESCRIPTION OF THE EMBODIMENTS

As an example of an imaging apparatus that includes a depth detection apparatus according to the present invention, a digital still camera will be described herein below, but application of the present invention is not limited to this. For example, the depth detection apparatus according to the present invention can also be applied to a digital video camera, a digital depth measuring unit and the like.

In the description with reference to the drawings, a component indicating a same component is denoted with a same reference sign, even if a figure number is different, and redundant description is minimized.

Depth Detection Apparatus

Figure 1A:
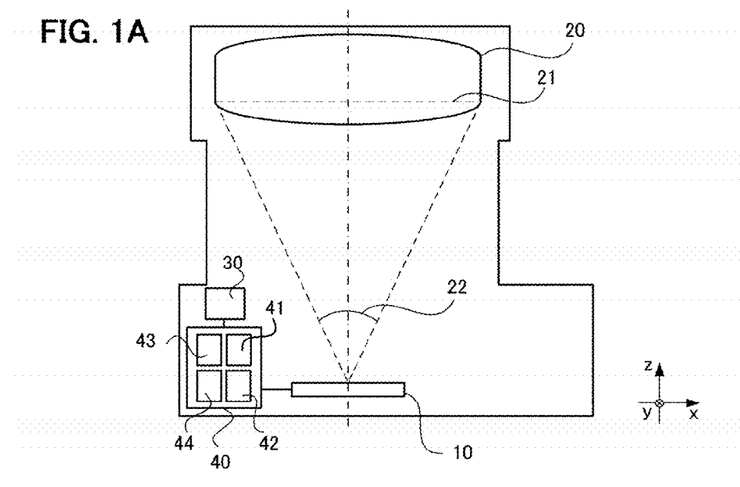
FIGS. 1A to 1C are schematic diagrams depicting an example of an imaging apparatus that includes a depth detection apparatus according to an embodiment.

FIG. 1A is a schematic diagram depicting an imaging apparatus that includes a depth detection apparatus 40 according to this embodiment. This imaging apparatus has an image pickup element 10, an imaging optical system 20, and a recording apparatus 30, in addition to the depth detection apparatus 40. Furthermore, the imaging apparatus includes a driving mechanism for focusing of the imaging optical system 20, a shutter, an ornamental image generation unit, a display for confirming an image, such as a liquid crystal display, among other components.

Figure 1B:
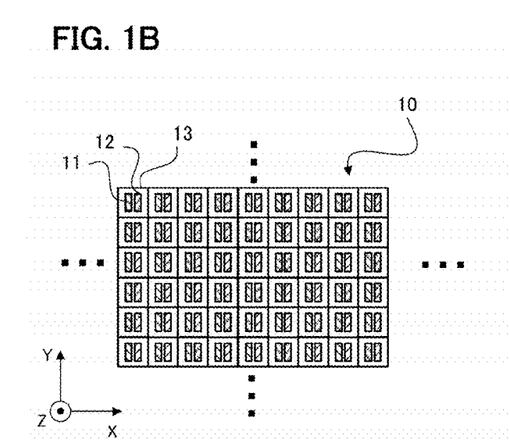

FIG. 1B is a schematic diagram depicting an example of the image pickup element 10. The image pickup element 10 has a plurality of depth measuring pixels 13 each of which includes photoelectric conversion units 11 and 12 (hereafter called "depth measuring pixel" is simply referred to as "pixel"). In concrete terms, a solid-state image pickup element, such as a sensor using a complementary metal oxide semiconductor (CMOS sensor) and a sensor using a charge-coupled device (CCD sensor), can be used for the image pickup element 10.

Figure 1C:
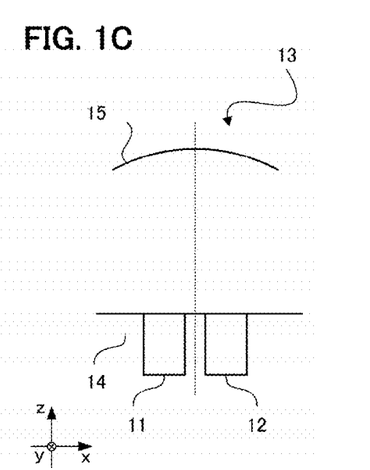

FIG. 1C is a cross-sectional schematic diagram depicting an example of the pixel 13. The photoelectric conversion units 11 and 12 of the pixel 13 are formed on a substrate 14. The pixel 13 has a micro lens 15. The micro lens 15 is disposed so that an exit pupil 21 and the photoelectric conversion units 11 and 12 are optically conjugate with each other.

As shown in FIG. 1A, the imaging optical system 20 forms an image of an object, which exists externally, on a surface of the image pickup element 10. The image pickup element 10 acquires the luminous flux transmitted through the exit pupil 21 of the imaging optical system 20 by the photoelectric conversion unit 11 or 12 of the pixel 13 via the micro lens 15, and converts the acquired luminous flux into an electric signal. In concrete terms, a luminous flux that passed through a first pupil region 23 (see FIG. 2B) of the exit pupil 21 is converted into an electric signal by the photoelectric conversion unit 11 of each pixel 13. A luminous flux that passed through a second pupil region 24 (see FIG. 2C), which is different from the first pupil region, of the exit pupil 21, is converted into an electric signal by the photoelectric conversion unit 12 of each pixel 13. The pixel 13 includes a floating diffusion (FD) unit, a gate electrode, wiring and the like, to output the electric signals to the depth detection apparatus 40.

All the pixels of the image pickup element 10 may be the depth measuring pixels 13. Or the image pickup element 10 may have pixels including a single photoelectric conversion unit and the depth measuring pixels 13. By adding the signals acquired by the plurality of photoelectric conversion units 11 and 12 of each pixel 13, an image signal equivalent to the case of having a single photoelectric conversion unit can be generated. Or the image pickup element 10 may have pixels including only the photoelectric conversion unit 11 configured to receive the luminous flux that passed through the first pupil region 23, and pixels including only the photoelectric conversion unit 12 configured to receive the luminous flux that passed through the second pupil region 24. The pixels 13 may be discretely disposed in the image pickup element 10, or may be disposed in the X direction at different intervals from the Y direction.

The depth detection apparatus 40 has a function to calculate the depth information of an object based on a first signal $S_1$ corresponding to the luminous flux that passed through the first pupil region 23 of the exit pupil 21 of the imaging optical system 20 and a second signal $S_2$ corresponding to the luminous flux that passed through the second pupil region 24. In concrete terms, the depth detection apparatus 40 has the following functional units: a filter generation unit 41, a signal processing unit (filter processing means) 42, a shift amount calculation unit (shift amount calculation means) 43, and a depth deriving unit (depth deriving means) 44. The depth detection apparatus 40 is constituted by a signal processing board including a CPU and a memory, and these functional units are implemented by a CPU that executes programs. The signal processing board can be constructed using an integrated circuit on which semiconductor elements are integrated, and can be an IC, and LSI, a system LSI, a micro processing unit (MPU), a central processing unit (CPU) or the like.

The first signal $S_1$ is a set of each electric signal generated by the photoelectric conversion unit 11 of each pixel 13. In the first signal $S_1$, a position of each pixel 13 on the image pickup element and each electric signal generated by the photoelectric conversion unit 11 of each pixel 13 are corresponded.

The second signal $S_2$ is a set of each electric signal generated by the photoelectric conversion unit 12 of each pixel 13. In the second signal $S_2$, a position of each pixel 13 on the image pickup element and each electric signal generated by the photoelectric conversion unit 12 of each pixel are corresponded.

The shift amount calculation unit 43 has a function to calculate the positional shift amount of two image signals. For example, the shift amount calculation unit 43 calculates a positional shift amount between the signals $S_1$ and $S_2$ (provisional image shift amount), or calculates a positional shift amount between the signals $CS_1$ and $CS_2$ after performing the later mentioned filter processing.

The filter generation unit 41 has a function to generate a filter (digital filter) based on the provisional image shift amount calculated by the shift amount calculation unit 43, the phase transfer function corresponding to the signal $S_1$, and the phase transfer function corresponding to the signal $S_2$.

The signal processing unit 42 has a function to perform filter processing on one or both of the signals $S_1$ and $S_2$ using the filter generated by the filter generation unit 41.

The depth deriving unit 44 has a function to calculate the depth information of the object from the shift amount calculated by the shift amount calculation unit 43.

The recording apparatus 30 is constituted by a read/write memory, and has a function to temporarily or permanently record a signal or an operation result read by the depth detection apparatus 40.

Depth Detection Method

In this embodiment, the distance between the imaging optical system 20 and the image pickup element 10 is sufficiently long with respect to the size of the pixel 13. Therefore the luminous flux that passed through different positions on the exit pupil 21 of the imaging optical system 20 enter the surface of the image pickup element 10 as luminous flux of the beams having different incident angles. The luminous flux enters the photoelectric conversion units 11 and 12 at a predetermined angle range 22 (FIG. 1A) in accordance with the shape of the exit pupil 21 and the image height (position on the image pickup element where the luminous flux reaches).

The sensitivity distribution on the exit pupil, when the sensitivity characteristics of the photoelectric conversion units 11 and 12, with respect to the incident luminous flux, are projected onto the exit pupil in accordance with the angle, is called the "pupil transmittance distribution". The center of the gravity position of the pupil transmittance distribution in this case is called the "pupil gravity center". The pupil gravity center can be calculated using the following Expression (1). In Expression (1), r denotes the coordinates on the exit pupil 21, t denotes the pupil transmittance distribution of the photoelectric conversion units 11 and 12, and the integration range is the region on the exit pupil 21.

$$g = \frac{\int r \cdot t(r) dr}{\int t(r) dr} \quad (1)$$

Out of the region on the exit pupil 21 through which the luminous flux to be received by the photoelectric conversion unit passes, a region, where the pupil gravity center is included, and the sensitivity of the corresponding photoelectric conversion unit is higher than a predetermined threshold, is called the "pupil region". The direction connecting the pupil gravity centers of the two pupil region is called the "pupil dividing direction" and the length between the pupil gravity centers is called the "base line length". In this embodiment, the pupil dividing direction is the x direction, and this direction is assumed to be the first direction, and the y direction, which is perpendicular to the x direction, is assumed to be the second direction.

In this embodiment, the absolute value of the shift amount between the imaging plane of the imaging optical system 20 and the light receiving plane of the image pickup element 10 in the optical axis direction (z direction) is called the "defocus amount".

Figure 2A:
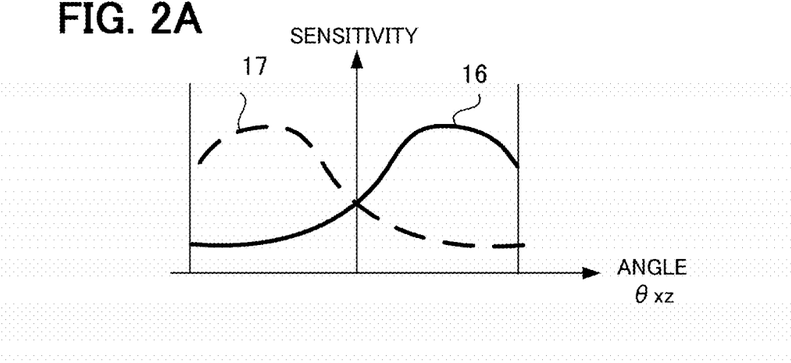
FIGS. 2A to 2C are diagrams depicting the sensitivity characteristic of the depth measuring pixel and pupil region.

FIG. 2A shows the sensitivity characteristic 16 of the photoelectric conversion unit 11 and the sensitivity characteristic 17 of the photoelectric conversion unit 12, with respect to the luminous flux that enters the xz plane. The abscissa indicates the angle formed by the incident luminous flux in the xz plane and the z axis, and the ordinates indicate the sensitivity.

Figure 2B:
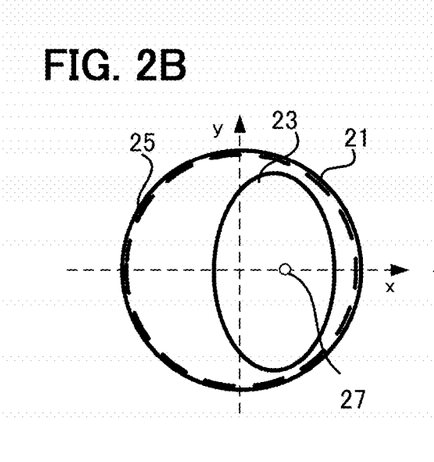

FIG. 2B shows the exit pupil 21 of the imaging optical system 20, and the pupil transmittance distribution 25, the pupil gravity center 27, and the pupil region 23 (first pupil region) corresponding to the photoelectric conversion unit 11. The pupil region 23 is a pupil region decentered from the center of the exit pupil 21 in the +x direction (first direction). The photoelectric conversion unit 11 of each pixel 13 is configured to receive primarily the luminous flux that passed through the pupil region 23. Because of this configuration, the first signal $S_1$, corresponding to the luminous flux that passed through the pupil region 23, can be acquired.

Figure 2C:
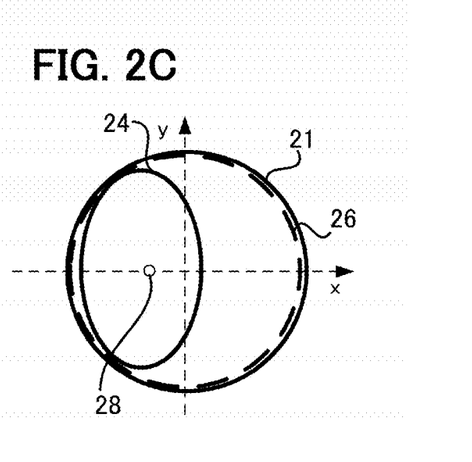

FIG. 2C shows the exit pupil 21 of the imaging optical system 20, and the pupil transmittance distribution 26, the pupil gravity center 28, and the pupil region 24 (second pupil region) corresponding to the photoelectric conversion unit 12. The pupil region 24 is a pupil region decentered from the center of the exit pupil 21 in the -x direction (second direction). The photoelectric conversion unit 12 of each pixel 13 is configured to receive primarily the luminous flux that passed through the pupil region 24. Because of this configuration, the second signal $S_2$, corresponding to the luminous flux that passed through the pupil region 24, can be acquired.

The signals $S_1$ and $S_2$ can be given by the following Expression (2).

$$\begin{aligned} S_j &= f * PSF_j \\ &= FFT^{-1}[FFT[f] \cdot OTF_j] \\ &= FFT^{-1}[FFT[f] \cdot MTF_j \cdot \exp(i \cdot PTF_j)] \\ &= FFT^{-1}[FFT[f] \cdot MTF_j \cdot \exp(i \cdot ptf_j + PG_j)] \end{aligned} \quad (2)$$

f denotes the light quantity distribution of the object, and * denotes the convolutional integration. Subscript j indicates 1 or 2. $PSF_j$ and $OTF_j$ are a point spread function and an optical transfer function corresponding to the j-th pupil region respectively. The point spread function and the optical transfer function are transfer functions to express the degree of deterioration of the luminous flux from the object caused by the imaging optical system 20 and the image pickup element 10 when the luminous flux is acquired as the signal $S_j$, expressed in the real spatial domain and spatial frequency domain respectively. FFT indicates a Fourier transform, and FFT[f] is the Fourier-transformed light quantity distribution f of the object. $FFT^{-1}$ indicates an inverse Fourier transform.

$OTF_j$ is expressed as a function of which amplitude term is a modulation transfer function MTF, and phase term is a phase transfer function $PTF_j$ ($OTF_j = MTF \times \exp(iPTF_j)$). MTF and $PTF_j$ are functions to determine the change amount of the amplitude and position of each spatial frequency component caused by the transfer respectively.

$PG_j$ is a component worked out by converting the moving distance, due to defocusing of the center of gravity position of the $PSF_j$, into a phase amount with respect to each spatial frequency, and is a component that does not influence the profile of the signal.

$ptf_j$ is a component when $PG_j$ is removed from $PTF_j$, and is a component that influences the profile of a signal included in $PTF_j$. Because of the eclipse of the luminous flux caused by the frame of the optical system or the like, and the difference in the sensitivity characteristic of the pixels 13, $PSF_1$ and $PSF_2$, $MTF_1$ and $MTF_2$, or $PTF_1$ ($ptf_1$) and $PTF_2$ ($ptf_2$) are functions having a difference profile from each other respectively.

Figure 3A:
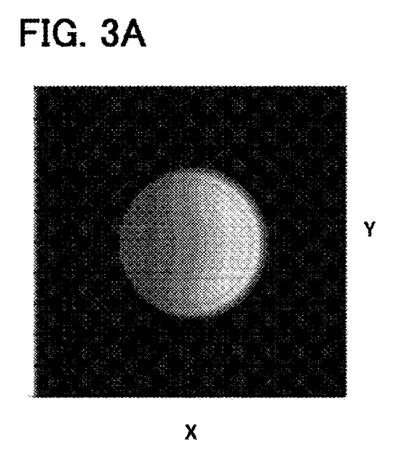
FIGS. 3A to 3C are diagrams depicting a point spread function.
Figure 3B:
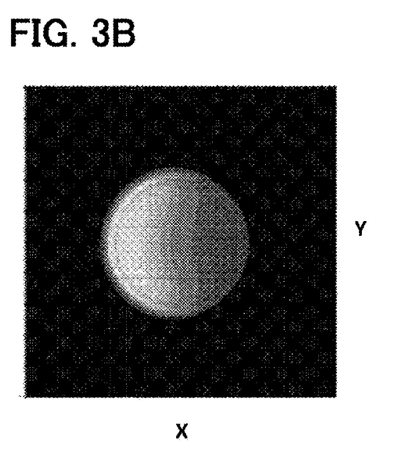
Figure 3C:
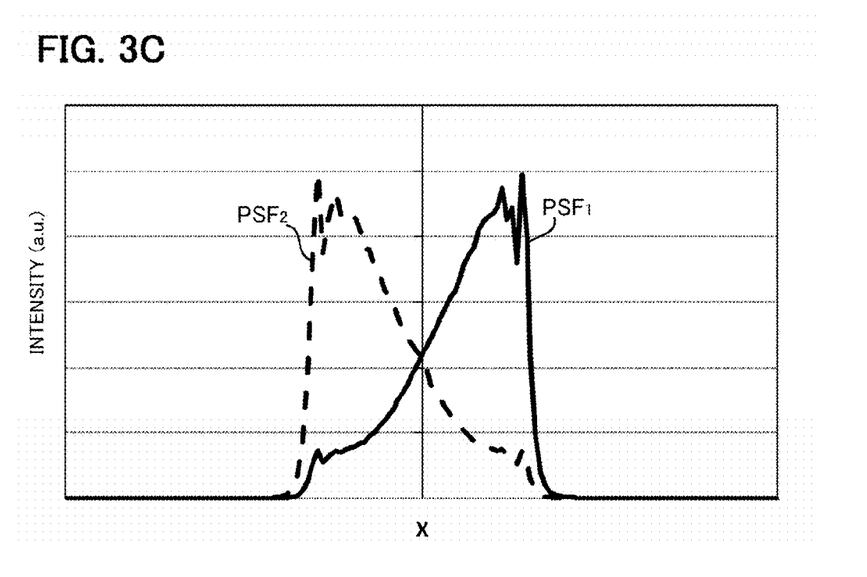

FIGS. 3A and 3B show $PSF_1$ and $PSF_2$ respectively. The abscissa and ordinate indicate the x coordinate and the y coordinate respectively. As a value becomes greater, the portion is expressed as whiter. FIG. 3C is a cross-sectional view of each PSF in the x direction. As shown in FIGS. 3A and 3B, $PSF_1$ and $PSF_2$ are different, hence the profiles of the signals $S_1$ and $S_2$ are different, and a calculation error is generated in the shift amount. Even if objects are located at a same depth, the profile difference between these signals changes depending on the distribution of the spatial frequency components included in the object, and the calculation error amount of the shift amount changes. As a result, the depth measurement error or the dispersion of measured depth values increases.

Figure 4:
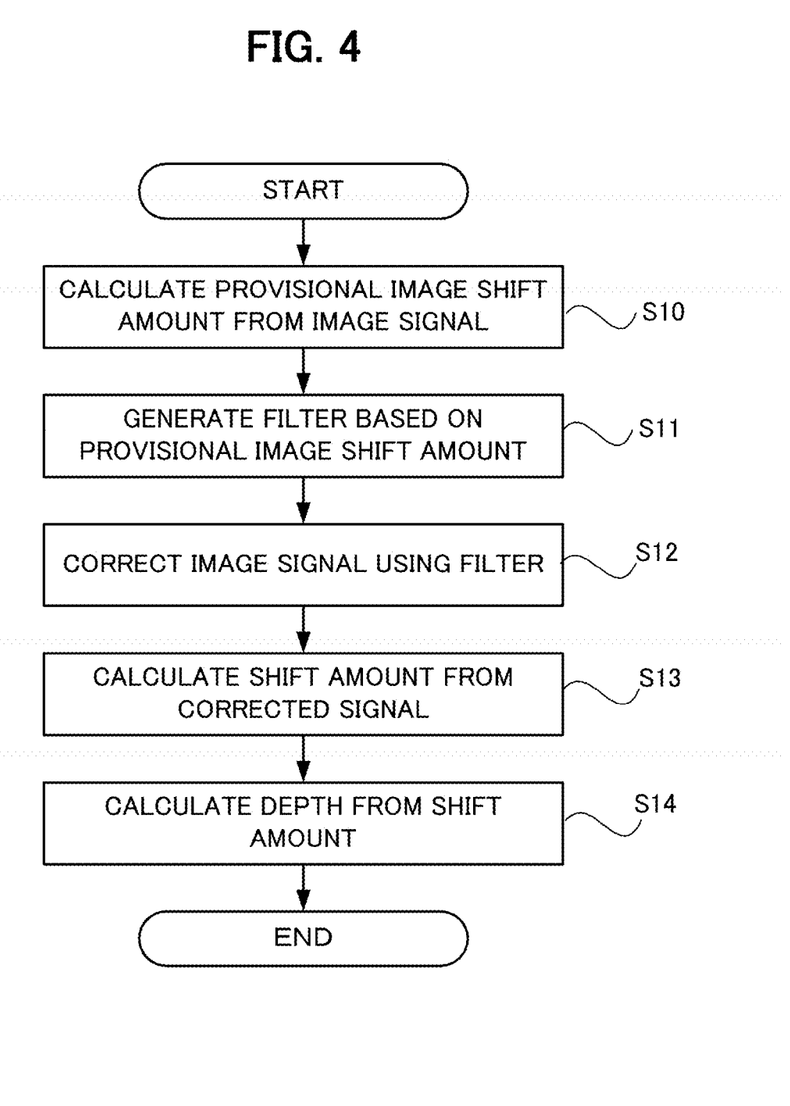
FIG. 4 is a flow chart depicting an example of a flow of the depth detection method according to an embodiment.

FIG. 4 is a flow chart depicting the depth detection method performed by the depth detection apparatus 40 for detecting a depth to an object. This depth detection method includes a shift amount calculation step, a signal processing step, and a depth calculation step.

Provisional Image Shift Amount Calculation Step

In the provisional image shift amount calculation step (provisional image shift amount calculation step: step S10), the shift amount calculation unit 43 calculates the shift amount (provisional image shift amount) from the signals $S_1$ and $S_2$. The shift amount of the signals $S_1$ and $S_2$ in the x direction (first direction) is determined by a known method. For example, a correlation operation is performed while shifting one of the pairs of signals ($S_1$, $S_2$) in the x direction, and the shift amount, when the correlation is highest, is calculated as the provisional image shift amount.

Filter Generation Step

Then in the filter generation step (step S11), the filter generation unit 41 generates a filter (digital filter) to correct an image signal. In this embodiment, the filter generation unit 41 generates a filter $ICF_1$ which is applied to the signal $S_1$, and a filter $ICF_2$ which is applied to the signal $S_2$. The filter generation unit 41 generates a filter $ICF_j$ based on the provisional image shift amount calculated in step S10 and the optical transfer function $OTF_j$. These filters have an Ax number of cells in the x direction, and an Ay number of cells in the y direction (Ax and Ay are 1 or greater integers).

The filter $ICF_1$ is expressed by a function generated by adding an inverse number of $OTF_1$ and a coefficient $\alpha_1$ in the frequency space. The filter $ICF_2$ is expressed by a function generated by adding an inverse number of $OTF_2$ and a coefficient $\alpha_2$ in the frequency space. In this embodiment, an example of using only the phase transfer function PTF, without using the modulation transfer function MTF of OTF, is shown. OTF, MTF and PTF are functions that change in accordance with the defocus amount.

The filter ICF is given by the following Expressions (3) and (4). The subscript j is 1 or 2.

$$ICF_j = FFT^{-1}[\exp(i \cdot FP_j)] \quad (3)$$

$$FP_j = -ptf_j \cdot \alpha_j \quad (4)$$

$FP_j$ is a phase term in the frequency space of ICF. The phase term $FP_j$ has $ptf_j$ and $\alpha_j$, which are components that influence the profile of the phase transfer function $PTF_j$. The coefficient $\alpha_j$ is a real number that is greater than 0 and smaller than 1 ($0 < \alpha_j < 1$). In other words, the filter $ICF_j$ is a filter of which phase term $FP_j$ is a function generated by multiplying a component $ptf_j$, which influences the profile of the phase transfer function $PTF_j$ corresponding to the j-th pupil region, by a real number coefficient $\alpha$ ($0 < \alpha < 1$). Expressions (3) and (4) may be transformed into other expression formats. These modified expressions are also included in the embodiment of the filter according to the present invention.

A concrete method for generating the filter ICF is not especially limited. For example, the filter generation unit 41 holds the filter data (cell values) in accordance with each condition in advance, and generates the filter by calling up (determining) the filter data corresponding to the provisional image shift amount calculated in step S10.

The filter generation unit 41 may hold only the filter data corresponding to a representative provisional image shift amount values in advance, and generate the filter by interpolating the filter data, held in advance, for a provisional image shift amount values other than the representative provisional image shift amount values. As the provisional image shift amount (defocus amount) increases or decreases, the optimum values of $ptf_j$ and $\alpha_j$ also increase or decrease (details described later in description on the core principle). Therefore a filter in accordance with each provisional image shift amount can be generated by this method as well.

The filter generation unit 41 may hold data of the filter of $\alpha_j = 0$ ($FP_j = 0$) in advance corresponding to a representative value of a provisional image shift amount, and data of the filter of $\alpha_j = 1$ ($FP_j = -ptf_j$) corresponding to the next representative value, and generate a filter by interpolating this data. By this generation method as well, a filter, of which phase term is $ptf_1$ and which has a coefficient $\alpha_1$ greater than 0 and smaller than 1, can be generated for the same reason. By these methods, the filter data volume to be held can be reduced, and the recording capacity for holding the filter can be decreased.

The filter generation unit 41 may approximate the filter data by a function and hold each coefficient of that function. For example, the cell value of the filter is approximated by a polynomial of which variable is a position in the filter, and the filter generation unit 41 holds each coefficient of the function (polynomial). For example, as Expression (5) shows, the cell value may be approximated by a polynomial of a trigonometric function (trigonometric polynomial) having the frequency $f_n$, and the amplitude $M_n$ and the phase $P_n$, with respect to a predetermined frequency, may be held as coefficients. m is an arbitrary integer. In this case, the amplitude $M_n$ and the phase $P_n$ correspond to the amplitude (omitted in this embodiment) and the phase $FP_j$ of $ICP_j$ respectively.

$$ICF \approx \sum_{n=1}^{m} M_n \cdot \cos(f_n + P_n) \quad (5)$$

The filter generation unit 41 reads (determines) a coefficient in accordance with the depth measuring conditions, and generates a filter. By this method, the file data volume to be held can be reduced, and the recording capacity for holding the filter can be further decreased.

Image Signal Correction Step

Then in the image signal correction step (filter processing step: step S12), the signal processing unit 42 performs convolutional integration of the filters $ICF_1$ and $ICF_2$ generated in step S11 with the signals $S_1$ and $S_2$ respectively, whereby the corrected signals $CS_1$ and $CS_2$ are generated.

The corrected signal $CS_j$ is given by Expressions (6) and (7) using Expressions (2) and (3).

$$CS_j = S_j * ICF_j = FFT^{-1}[FFT[S_j] \cdot \exp(i\,FP_j)] \quad (6)$$
$$= f * FFT^{-1}[MTF_j \cdot \exp(i\,cptf_j + PG_j)]$$
$$= f * CPSF_j$$

$$cptf_j = ptf_j \cdot (1 - \alpha_j) \quad (7)$$

To simplify description, it is assumed here that $MTF_1=MTF_2$ and $\alpha_1=\alpha_2=\alpha$. A case when the MTFs are different will be described later. Even if the values of $\alpha_1$ and $\alpha_2$ are different, the core principle is the same, and a similar effect can be obtained.

$cptf_j$ is a function to determine the profile of $CS_j$, and $CPSF_j$ is a point spread function generated by transforming $PSF_j$. $cptf_j$ determines the profile of $CPSF_j$, in other words, $cptf_j$ determines the profile of the corrected signal $CS_j$. The phase difference to determine the difference of the profiles of $CS_1$ and $CS_2$ is given by the following Expression (8).

$$\Delta cptf = cptf_1 - cptf_2 = \Delta ptf \cdot (1-\alpha) \quad (8)$$

In Expression (8), $\Delta ptf$ is a difference between $ptf_1$ and $ptf_2$, and $\Delta cptf$ is a difference between $cptf_1$ and $cptf_2$, and are a difference of the profiles between $S_1$ and $S_2$ and a difference of the profiles between $CS_1$ and $CS_2$ respectively expressed as the phase differences. BY setting the value of $\alpha$ to a real number greater than 0 and smaller than 1, $\Delta cptf$ becomes smaller than $\Delta ptf$, and the difference of the profiles between $CS_1$ and $CS_2$ can be lesser than the difference of the profiles between $S_1$ and $S_2$.

Figure 5A:
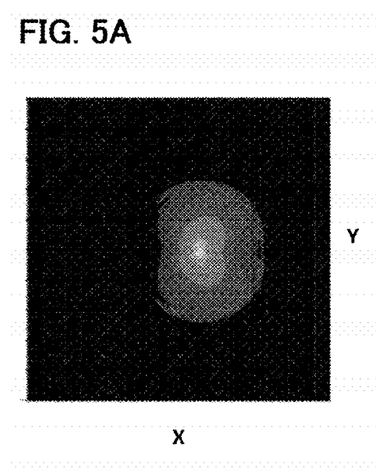
FIGS. 5A to 5C are diagrams depicting a modified point spread function by performing the signal correction processing according to an embodiment.
Figure 5B:
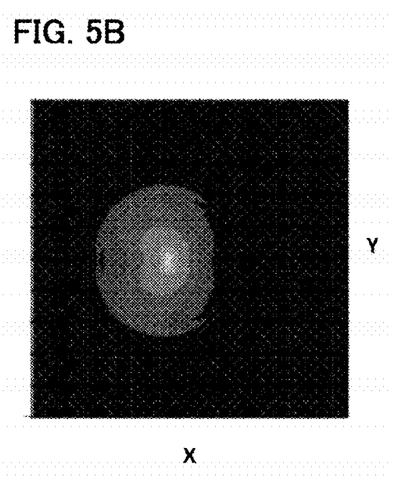
Figure 5C:
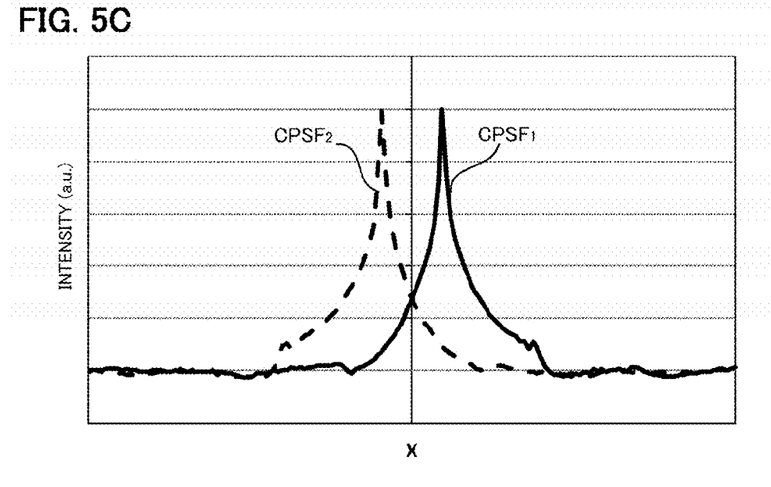

FIGS. 5A and 5B show $CPSF_1$ and $CPSF_2$ respectively. The abscissa and the ordinate indicate the x coordinate and the y coordinate respectively. As a value is greater, the portion is expressed as whiter. FIG. 5C is a cross-sectional view of $CPSF_1$ and $CPSF_2$ in the x direction, where the solid line indicates $CPSF_1$ and the broken line indicates $CPSF_2$. As FIGS. 5A to 5C show, $CPSF_1$ and $CPSF_2$ have more similar profiles than the original $PSF_1$ and $PSF_2$ (FIGS. 3A to 3C). The corrected signals $CS_1$ and $CS_2$ are signals of which profiles are similar, therefore the shift amount can be calculated at high precision. As a result, the depth information of the object can be calculated at high precision in the later mentioned depth calculation step.

Shift Amount Calculation Step

Then in the shift amount calculation step (step S13), the shift amount calculation unit 43 calculates the shift amount between the corrected signals $CS_1$ and $CS_2$ in the x direction (first direction). In step S13, the same method as the provisional image shift amount calculation step in step S10 can be used.

Depth Deriving Step

In the depth deriving step (depth deriving step: step S14), the depth deriving unit 44 derives the information on the depth to the object based on the shift amount calculated in step S13. In step S14, the depth deriving unit 44 determines the defocus amount based on the determined shift amount, and derives the depth information on the object from the defocus amount and the image forming relationship of the imaging optical system 20. For example, the defocus amount $\Delta L$ can be calculated using the following Expression (9).

$$\Delta L = Ka \cdot d \quad (9)$$

$d$ denotes the shift amount, and $Ka$ denotes a conversion coefficient. The defocus amount $\Delta L$ may be derived using a table showing the correspondence between the shift amount $d$ and the defocus amount $\Delta L$ (correspondence table), which is acquired in advance.

The defocus amount can easily be converted into a depth from the image pickup element 10 to the object in a real space using the image forming relationship of the imaging optical system, hence the defocus amount can be regarded as the information on the depth to the object. The depth deriving unit 44 may output the defocus amount or output the depth in the real space, as the information on the depth from the image pickup element 10 to the object. The depth information output by the depth deriving unit 44 may be a depth from the focus position (focused position in the real space) to the object (relative depth), or the depth from the imaging apparatus (image pickup element 10) to the object (absolute depth) when the image is captured. The absolute depth or the relative depth may be either one of the depth on the image plane side, or the depth on the object side. The depth may be expressed by a depth in the real space, or may be expressed by an amount that can be converted into the depth in the real space, such as the defocus amount and the image shift amount.

By this depth detection method, the depth information of the object can be calculated at high-speed and high precision.

Principle

A method for determining a coefficient ($\alpha_j$) of the filter according to this embodiment will be described in more detail.

The above mentioned provisional image shift amount includes a detection error, since signals before correcting the image profiles are used. If this error exists, Expressions (3) and (4) can be expressed as Expressions (10) and (1) respectively.

$$ICF_j = FFT^-[\exp(i \cdot FP'_j)] \quad (10)$$

$$FP'_j = -(ptf_j + \delta ptf_j) \cdot \alpha_j \quad (11)$$

$\delta ptf_j$ is a phase error due to an error of the provisional image shift amount, and $\delta ptf_1$ and $\delta ptf_2$ are functions having different spatial frequency characteristics. The phase difference $\Delta cptf'$, which determines the profile difference of the corrected signals, is given by Expression (12).

$$\Delta cptf' = (1-\alpha) \cdot \Delta ptf - \alpha \cdot \Delta \delta ptf \quad (12)$$

$\Delta \delta ptf$ indicates the difference between $\delta ptf_1$ and $\delta ptf_2$. To simplify description, it is assumed that $\alpha_1=\alpha_2=\alpha$. If the value of the coefficient $\alpha$ is 1 and the provisional image shift amount is without error ($\delta ptf_1=0$), then $\Delta cptf'$ becomes 0 based on Expression (12), and the profiles of the corrected signals become the same. However, if the provisional image shift amount has an error, $\Delta cptf'$ becomes $\Delta \delta ptf$, and the corrected signals have different profiles from each other. If $\Delta \delta ptf$ is greater than $\Delta ptf$, the profile difference between the corrected signals becomes greater than the profile difference between the original signals.

In this embodiment, the value of the coefficient $\alpha$ is assumed to be a real number that is greater than 0 and smaller than 1. As Expression (12) shows, if the value α becomes less, the term related to the error of the provision image shift amount (second term at right side) decreases, and the term related to the profile difference of the original signal (first term at right side) increases. By setting the value of α to an optimum value so that Δcptf becomes smaller than Δptf, the profile difference between the corrected signals can be decreased while reducing the influence of the error of the provisional image shift amount. Then the calculation accuracy of the image shift amount and the depth detection accuracy can be improved.

Figure 6:
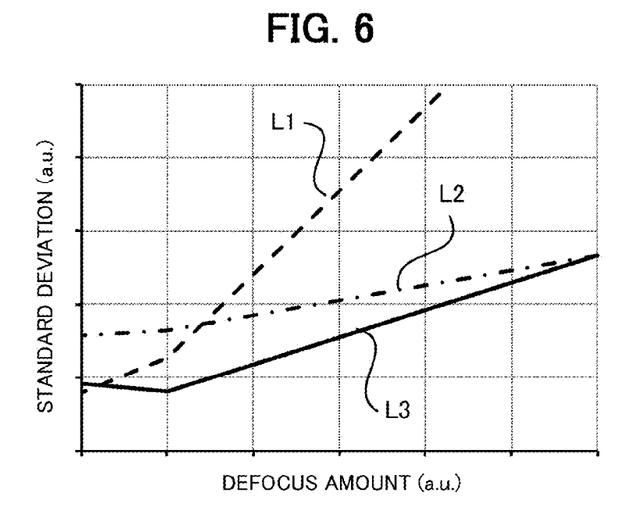
FIG. 6 is a graph showing an effect of the depth detection method according to an embodiment.

FIG. 6 is a graph showing the relationship between each defocus amount and defocus amount detection error. The abscissa indicates the defocus amount, and the ordinate indicates the standard deviation of the depth detected for various objects. The value increases in the direction to the right on the abscissa and in the direction on the ordinate. The broken line L1 indicates the result determined by using the signals $S_1$ and $S_2$, the broken line L2 indicates the result determined by using the conventional image profile correction method (equivalent to when α=1), and the solid line 3 indicates the result determined by using the image profile correction method of this embodiment. As FIG. 6 shows, the detection error decreases if the method of this embodiment is used. By setting the value of α to an optimum value that is greater than 0 and smaller than 1 in the image signal correction processing, the shift amount calculation error can be reduced, and depth detection at high precision becomes possible.

If it is assumed that Δcptf=0 in Expression (12), then α is given by Expression (13). In other words, an optimum value of α can be determined based on the value of Δptf (profile difference between the first signal $S_1$ and the second signal $S_2$) and the value of Δδptf (error amount of the provisional image shift amount). By setting the coefficient α in this way, an increase in the profile difference, more than the profile difference before correction by the image profile correction processing, can be prevented.

$$\alpha = \frac{1}{1 + \frac{\Delta\delta ptf}{\Delta ptf}} \quad (13)$$

Δptf and Δδptf change depending on such conditions as distribution and distance of the spatial frequency components included in the object, and the states of the imaging optical system 20 and the image pickup element 10. Δptf can be determined by numerical calculation based on the design values of the imaging optical system 20 and the image pickup element 10. Δδptf can be determined in advance by calculating the shift amount and depth to the object located at a known depth based on actual measurement or numerical calculation, and by determining the error amount. The values of Δptf and Δδptf under various conditions are determined in advance using these methods, thereby a value of α can be determined in accordance with the image capturing conditions. Even in the case when the values of $\alpha_1$ and $\alpha_2$ are different, the core principle is the same, and a similar effect can be acquired.

It is preferable that the value of a is smaller as the provisional image shift amount is smaller. If the provisional image shift amount (defocus amount) becomes smaller, the influence of the eclipse of luminous flux, caused by the frame of the optical system or the like, decreases, therefore Δptf decreases. On the other hand, Δδptf is determined by the influence of the noise included in the signal and the performance of the depth measuring operation, hence even if the provisional image shift amount (defocus amount) is smaller, Δδptf has a predetermined value or more. As the provisional image shift amount decreases, the influence of Δδptf increases more than Δptf. As a consequence, depth detection at higher precision becomes possible by decreasing the value a as the provisional shift amount is smaller, so as to reduce the influence of Δδptf.

Figure 7:
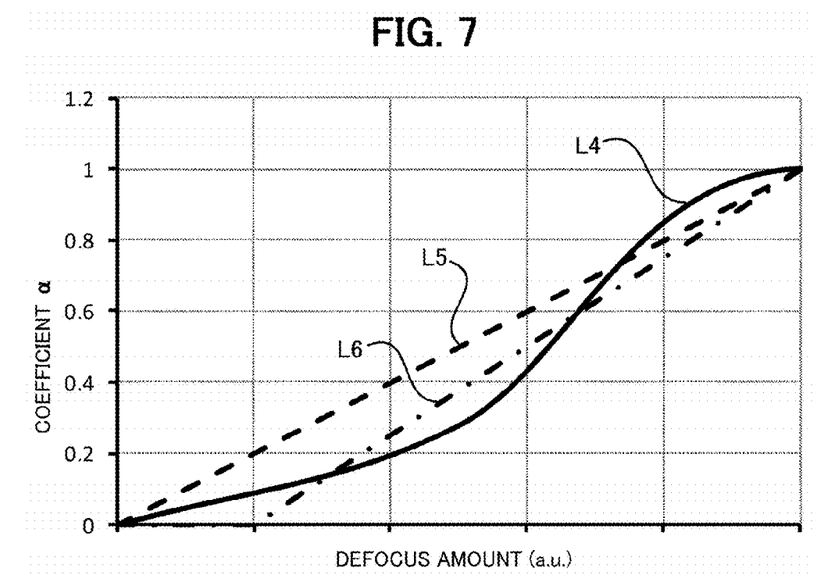
FIG. 7 is a graph showing an example of a coefficient α according to an embodiment.

FIG. 7 is a graph showing an example of a relationship between the coefficient α calculated using Expression (13) and the defocus amount. The abscissa indicates the defocus amount, and the ordinate indicates α. The value increases in the direction to the right on the abscissa. The solid line L4 indicates the coefficient α calculated using Expression (13). If α is set such that the value of α decreases as the provisional image shift amount (defocus amount) decreases, as shown by the solid line L4, the above mentioned effect can be acquired. Or α calculated by approximating the solid line 4 by a polynomial may be used, as shown in Expression (14). n and m are integers. The broken line L5 indicates an example of α approximated using a linear function. α calculated by approximating a part of the solid line L4 by a polynomial may be used, as indicated by the broken line L6. In both cases, the above mentioned effect can be acquired.

$$\alpha = \sum_{n=0}^{m} b_n \cdot x^n \quad (14)$$

Other Filters

The filter $ICF_j$ may be a filter having the amplitude term $FM_j$, as shown in Expressions (15) and (16). The filter given by Expressions (15) and (16) is also a filter based on the inverse number of $OTF_j$.

$$ICF_j = FFT^{-1}[FM_j \exp(i \cdot FP_j)] \quad (15)$$

$$FM_j = MTF_j^{-1} \cdot \beta_j \quad (16)$$

$\beta_j$ denotes a coefficient to correct the amplitude of the filter (amplitude correction coefficient).

The corrected signal $CS_j$, when the provisional image shift amount has an error, can be expressed by Expressions (17) and (18), using Expressions (6), (15) and (16).

$$CS_j = S_j * ICF_j = f * FFT^{-1}[cmtf'_j \cdot \exp(i \ cptf'_j + PG_j)] \quad (17)$$

$$cmtf'_j = \left(\frac{MTF_j}{MTF_j + \delta MTF_j}\right) \cdot \beta_j \quad (18)$$

$cmtf_j$ is an amplitude term of $CS_j$. The difference between $cmtf_1$ and $cmtf_2$ and the difference between $cptf_1$ and $cptf_2$ determine the difference of the profiles between $CS_1$ and $CS_2$. As mentioned above, the difference of $cptf_j$ is corrected by the phase $FP_j$ of the filter. The difference of $cmtf_j$ is corrected by the amplitude $FM_j$ of the filter. By determining the value of $\beta_j$ such that the difference of $cmtf_1$ and $cmtf_2$ becomes smaller than the difference of $MTF_1$ and $MTF_2$, the difference between the amplitude of the signals $S_1$ and $S_2$ can be corrected even if the provisional image shift amount has an error. If $cmtf_1 = cmtf_2$ in Expression (18), the ratio of $\beta_1$ and $\beta_2$ can be given by Expression (19).

$$\frac{\beta_1}{\beta_2} = \frac{MTF_2}{MTF_1} \cdot \frac{MTF_1 + \delta MTF_1}{MTF_2 + \delta MTF_2} \qquad (19)$$

By determining $\beta_j$ to satisfy Expression (19), the difference of the amplitude components of the signals can be corrected. Just as phases $ptf_j$ and $\delta ptf_1$, $MTF_j$ and $\delta MTF_j$ can be determined by actual measurement or numerical calculation. If such a filter is used, the differences of the modulation transfer functions and phase transfer functions between $S_1$ and $S_2$ can be corrected, and the differences of the profiles of $S_1$ and $S_2$ can be further corrected. Thereby, an effect of further reducing the above mentioned shift amount calculation error can be obtained.

The filters expressed by the following Expressions (20) to (24) may be used for the filter $ICF_j$. The filters expressed by Expressions (20) to (24) are filter based on $OTF_j$.

$$ICF_j = FFT^{-1}[FM_j \cdot \exp(i \cdot FP_j)] \qquad (20)$$

$$FM_1 = MTF_2 \cdot \beta_1 \qquad (21)$$

$$FP_1 = ptf_2 \cdot \alpha_1 \qquad (22)$$

$$FM_2 = MTF_1 \cdot \beta_2 \qquad (23)$$

$$FP_2 = ptf_1 \cdot \alpha_2 \qquad (24)$$

The corrected signals $CS_j$, using the above filters, are expressed by Expressions (25) to (28) using Expressions (6), (20) and (24).

$$CS_1 = S_1 * ICF_1 = f \cdot FFT^{-1}[MTF_1 \cdot MTF_2 \cdot \beta_1 \cdot \exp[i(cptf_1 + PGA_1)]] \qquad (25)$$

$$CS_2 = S_2 * ICF_2 = f \cdot FFT^{-1}[MTF_1 \cdot MTF_2 \cdot \beta_2 \cdot \exp[i(cptf_2 + PGA_2)]] \qquad (26)$$

$$cptf_1 = ptf_1 + ptf_2 \cdot \alpha_1 \qquad (27)$$

$$cptf_2 = ptf_2 + ptf_1 \cdot \alpha_2 \qquad (28)$$

If $\alpha_1 = \alpha_2 = \alpha$, then the function $\Delta cptf$ to determine the profile difference of $CS_j$, and the function $\Delta cptf'$ when the provisional image shift amount has an error, become the same expressions as Expressions (8) and (12). Further, if conditions under which the amplitude components of $CS_1$ and $CS_2$ become the same are determined, this expression becomes the same as Expression (19). By using $\alpha_j$ and $\beta_j$ having optimum values, as mentioned above, the difference of the image profiles can be corrected, even if the provisional image shift amount includes a calculation error.

The image signal correction processing may be performed only for one of the signal $S_1$ and the signal $S_2$. For example, the filter $ICF$, used for the signal $S_1$, is generated based on the inverse function of the optical transfer function $OTF_1$ and the optical transfer function $OTF_2$. The filter $ICF$ is expression by the following Expressions (29) to (31).

$$ICF = FFT^{-1}[FM \cdot \exp(i \cdot FP)] \qquad (29)$$

$$FM = (MTF_2/MTF_1) \cdot \beta \qquad (30)$$

$$FP = (ptf_1 - ptf_1) \cdot \alpha \qquad (31)$$

The corrected signal $CS_1$, when the above filters are used, is expressed by Expressions (32) and (33) using Expressions (6) and (29) to (31).

$$CS_1 = \qquad (32)$$
$$S_1 * ICF = f \cdot FFT^{-1}\left[MTF_1 \cdot \left(\frac{MTF_2}{MTF_1}\right) \cdot \beta_1 \cdot \exp(i(cptf_1 + PG_1))\right]$$

$$cptf_1 = ptf_1 + (ptf_2 - ptf_1) \cdot \alpha_1 \qquad (33)$$

If $\alpha_1 = \alpha$, the function $\Delta cptf$ to determine the profile difference between $CS_1$ and $CS_2$ ($=S_2$), and the function of $\Delta cptf'$ when the provisional image shift amount has an error, become the same expressions as Expressions (8) and (12). Further, if conditions under which the amplitude components of $CS_1$ and $CS_2$ ($=S_2$) become the same are determined, this expression becomes the same as Expression (19) (where $\beta_2 = 1$). By using $\alpha_j$ and $\beta_1$ having optimum values, as mentioned above, the difference of the image profiles can be corrected, even if the provisional image shift amount includes a calculation error.

The profile can be corrected by performing the image signal correction processing for only one of the signals (first signal $S_1$). In this way, the calculation load of the signal correction processing can be reduced, and high-speed preprocessing becomes possible. If the signal correction processing is performed on only one of the signal (e.g. first signal $S_1$), the shift amount between the corrected signal (e.g. signal $CS_1$) and the other image signal for which the image signal correction processing is not performed (e.g. second signal $S_2$), is determined in step S13.

By using the above filters, the difference of the image profiles can be decreased, even if the provisional image shift amount has a calculation error, as mentioned above, and the calculation errors of the shift amount can be reduced.

In this embodiment, a processing method for generating a corrected signal by performing convolutional integration of the filter to the signal in the real space was described, but the image signal correction processing may be performed in the frequency space. In this case, the signal processing unit 42 is configured to perform the following processing. First the filter data in the frequency space (data in the brackets of the inverse Fourier transform $FFT^{-1}$ in Expression (3)), is held in advance. Then the acquired signal $S_j$ is Fourier-transformed, whereby the signal $FS_j$ in the frequency space is generated. By multiplying the signal $FS_j$ by the filter and performing inverse Fourier transform, the corrected signal $CS_j$ can be generated. Since calculation load is decreased when the filter is used, compared with the case of performing convolutional integration, depth can be measured at high-speed and high precision.

Each transfer function constituting the filter ICF may not be the above mentioned function, but may be a function approximated by another function. A function generated by approximating each transfer function by a polynomial or the like may be used. Even if the filter ICF is generated by such methods, the above mentioned effect can be acquired.

Modification of Depth Detection Method

In the above description, the value of the coefficient $\alpha$ is determined using Expression (13), but the value of the coefficient $\alpha$ can be any value greater than 0 and smaller than 1. As mentioned above, it is preferable that the value of the coefficient $\alpha$ is smaller as the provisional image shift amount is smaller, but may be a predetermined value regardless the provisional image shift amount. If the coefficient $\alpha$ is a value greater than 0 and smaller than 1, the image profile can be corrected and the depth is detected at higher precision than the conventional method (α=1) when the provisional image shift amount is smaller than the threshold.

Figure 8:
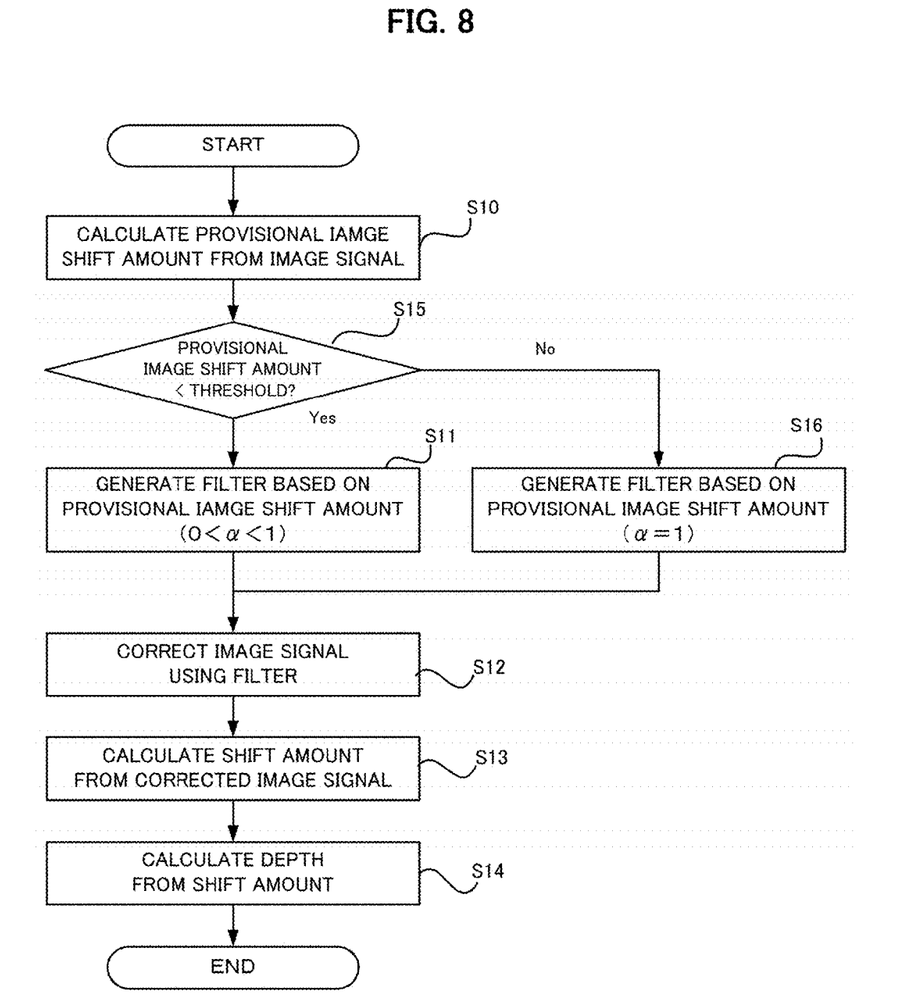
FIG. 8 is a flow chart depicting an example of a flow of the depth detection method according to an embodiment.

The depth detection apparatus 40 may include a shift amount determination unit configured to determine the magnitude of the provisional image shift amount. As shown in FIG. 8, the shift amount determination unit determines the magnitude of the provisional image shift amount in step S15. If the provisional image shift amount is smaller than a predetermined threshold, the filter generation step and the signal correction step are performed, and if the provisional image shift amount is the threshold or more, the second filter generation step (step S16), of generating a filter that is different from the one generated in step S11, is performed. A publically known filter to correct the profile of the image signal is generated in the second filter generation step. For example, the filter in which α=1 is set in the above description is generated. The influence of the error(s) of the provisional image shift amount is larger as the defocus amount is smaller. Therefore, if the provisional image shift amount is small, the filter according to the present invention (0<α<1) is used, and if the provisional image shift amount is large, the conventional filter (α=1) is used, whereby the image signal correction effect by the filter processing can be sufficiently obtained for each defocus amount. In other words, the shift amount calculation error and the depth calculation error can be reduced even if the processing according to this modification is used.

As shown in Expression (34), the depth L to the object may be directly calculated using a conversion coefficient Kb which links the shift amount d and the depth L to the object.

$$L = Kb \cdot d \quad (34)$$

Or the defocus amount ΔL may be calculated using Expression (35) and the object depth may be calculated from the defocus amount ΔL. Here Kc denotes the conversion coefficient, and H denotes a distance from the exit pupil 21 to the image pickup element 10. By using this expression, the defocus amount and the depth can be calculated at even higher precision.

$$\Delta L = \frac{d \cdot H}{Kc - d} \quad (35)$$

Depth Measurement Result

The depth measurement result by the depth detection apparatus of the present invention can be used, for example for the focal point detection of the imaging optical system. By the depth detection apparatus of the present invention, the depth information on the object can be measured at high-speed and high precision, and the shift amount between the object and the focal position of the imaging optical system can be detected. By controlling the focal position of the imaging optical system, the focal position can be aligned with the object at high-speed and high precision. The depth detection apparatus of this embodiment can be used for an imaging apparatus, such as a digital still camera and a digital video camera, and focal point detection can be performed in the optical system based on the depth detection result of the depth detection apparatus. Further, a depth map can be generated by measuring depth at a plurality of positions on the image pickup element 10 using the depth detection apparatus of the present invention.

Other Embodiments

In the above embodiment, an example of calculating the depth to the object was described, but the present invention may be applied to a parallax amount detection apparatus configured to detect a parallax amount corresponding to the shift amount. For example, in the parallax amount detection apparatus, an object near the focusing position can be extracted from the image based on the shift amount. The parallax amount may be the shift amount between two signals, or a physical amount related thereto.

If the depth deriving unit 44 of the depth detection apparatus 40 of Embodiment 1 is replaced with a parallax amount calculation unit, which is configured to calculate the parallax amount corresponding to the shift amount of two signals, the other configuration of the parallax amount detection apparatus may be the same as the depth detection apparatus 40. Further, the parallax amount detection apparatus may include an extraction unit configured to extract an object having a predetermined parallax amount from the image in accordance with the detected parallax amount (shift amount).

If the parallax amount calculation step is performed instead of the depth calculation step S14 in the flow chart in FIG. 4, the parallax amount detection method of this embodiment may be the same as the processing steps in FIG. 4. To calculate the parallax amount, the shift amount of the signals may be calculated, or a physical amount related thereto may be calculated.

Similarly to the depth detection apparatus of Embodiment 1, this parallax amount detection apparatus can also be used as a part of the imaging apparatus.

The present invention includes a computer program, in addition to the depth detection apparatus and the parallax amount detection apparatus. The computer program of this embodiment causes the computer to execute predetermined steps for calculating the depth or for calculating the parallax amount.

The program of this embodiment is installed on a computer of the depth detection apparatus, the parallax amount detection apparatus, or an imaging apparatus, such as a digital camera, that includes the depth detection apparatus or the parallax amount detection apparatus. The above mentioned functions are implemented by the computer executing the installed program, and the depth detection or parallax amount detection at high-speed and high precision can be performed.

The present invention can also be implemented by supplying the program, which implements one or more functions of the above mentioned embodiment, to a system or apparatus via a network or storage medium, and one or more processors of the computer of the system or apparatus reads and executes the program. The present invention can also be implemented by a circuit (e.g. ASIC) which implements one or more functions of the above mentioned embodiment.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-214737, filed on Oct. 30, 2015, which is hereby incorporated by reference herein in its entirety.

What is claimed is:

1. A depth detection apparatus for detecting depth information on an object, based on a first signal corresponding to a luminous flux that has passed through a first pupil region of an exit pupil of an imaging optical system, and a second signal corresponding to a luminous flux that has passed through a second pupil region, which is different from the first pupil region,
the depth detection apparatus comprising:
a shift amount acquisition unit configured to acquire a provisional image shift amount, which is an amount of positional shift between the first signal and the second signal;
a filter processing unit configured to perform filter processing on one or both of the first signal and the second signal using a filter, wherein the filter is generated based on the provisional image shift amount; and
a depth deriving unit configured to derive the depth information on an object, based on a positional shift amount between the filtered first signal and the filtered second signal, a positional shift amount between the filtered first signal and the unfiltered second signal, or a positional shift amount between the unfiltered first signal and the filtered second signal,
wherein a phase term of the filter is a function generated by multiplying a second function by a coefficient, the second function being generated based on a phase transfer function corresponding to the first pupil region or the second pupil region and on the provisional image shift amount, and the coefficient being a real number greater than 0 and smaller than 1.

2. The depth detection apparatus according to claim 1, wherein the depth detection apparatus includes a filter generation unit configured to generate the filter.

3. The depth detection apparatus according to claim 1, wherein the filter processing unit performs the filter processing on at least one of the first signal and the second signal using the filter when the provisional image shift amount is smaller than a predetermined threshold, and using a filter, which is different from the filter, when the provisional image shift amount is the predetermined threshold or more.

4. An imaging apparatus, comprising:
an imaging optical system;
an image pickup element configured to acquire a first signal and a second signal corresponding to a luminous flux that has passed through a first pupil region and a second pupil region of the imaging optical system respectively; and
the depth detection apparatus according to claim 1.

5. The depth detection apparatus according to claim 1, wherein the coefficient is determined in accordance with a magnitude of the provisional image shift amount, and has a smaller value as the provisional image shift amount is smaller.

6. The depth detection apparatus according to claim 5, wherein the coefficient is determined based on an error amount of the provisional image shift amount and a profile difference between the first signal and the second signal.

7. The depth detection apparatus according to claim 1, wherein the filter comprises: a first filter of which phase term is a function generated by multiplying a function indicating an inverse number of the phase transfer function corresponding to the first pupil region, by the coefficient; and a second filter of which phase term is a function generated by multiplying a function indicating an inverse number of the phase transfer function corresponding to the second pupil region, by the coefficient, and
the filter processing unit performs filter processing on the first signal using the first filter, and performs the filter processing on the second signal using the second filter.

8. The depth detection apparatus according to claim 7, wherein an amplitude term of the first filter is a function generated by multiplying a function indicating an inverse number of a modulation transfer function corresponding to the first pupil region, or a modulation transfer function corresponding to the second pupil region, by an amplitude correction coefficient, and
wherein an amplitude term of the second filter is a function generated by multiplying a function indicating an inverse number of a modulation transfer function corresponding to the second pupil region, or a modulation transfer function corresponding to the first pupil region, by the amplitude correction coefficient.

9. The depth detection apparatus according to claim 8, wherein the amplitude correction coefficient is determined based on the modulation transfer function corresponding to the first pupil region or the second pupil region, and an error amount of the provisional image shift amount.

10. The depth detection apparatus according to claim 1, wherein the phase term of the filter is a function generated by multiplying a function indicating a difference between a phase transfer function corresponding to the first pupil region and a phase transfer function corresponding to the second pupil region, by the coefficient, and
wherein the filter processing unit performs the filter processing only on one of the first signal and the second signal using the filter.

11. The depth detection apparatus according to claim 10, wherein the amplitude term of the filter is a function generated by multiplying a function based on one of a modulation transfer function corresponding to the first pupil region and a modulation transfer function corresponding to the second pupil region and an inverse function of the other, by an amplitude correction coefficient.

12. The depth detection apparatus according to claim 11, wherein the amplitude correction coefficient is determined based on the modulation transfer function corresponding to the first pupil region or the second pupil region, and an error amount of the provisional image shift amount.

13. A depth detection method for a depth detection apparatus to detect depth information on an object, based on a first signal corresponding to a luminous flux that has passed through a first pupil region of an exit pupil of an imaging optical system, and a second signal corresponding to a luminous flux that has passed through a second pupil region, which is different from the first pupil region, the method comprising:
a provisional image shift amount acquisition step of acquiring a provisional image shift amount, which is an amount of positional shift between the first signal and the second signal;
a filter processing step of performing filter processing on one or both of the first signal and the second signal using a filter, wherein the filter is generated based on the provisional image shift amount; and
a depth deriving step of deriving the depth information on an object based on a positional shift amount between the filtered first signal and the filtered second signal, a positional shift amount between the filtered first signal and the unfiltered second signal, or a positional shift amount between the unfiltered first signal and the filtered second signal,
wherein a phase term of the filter is a function generated by multiplying a second function by a coefficient, the second function being generated based on a phase transfer function corresponding to the first pupil region or the second pupil region and the provisional image shift amount, and the coefficient being a real number greater than 0 and smaller than 1.

14. A non-transitory computer-readable medium, storing a program allowing a computer to execute each step of a depth detection method for a depth detection apparatus to detect depth information on an object, based on a first signal corresponding to a luminous flux that has passed through a first pupil region of an exit pupil of an imaging optical system, and a second signal corresponding to a luminous flux that has passed through a second pupil region, which is different from the first pupil region, the method comprising:
a provisional image shift amount acquisition step of acquiring a provisional image shift amount, which is an amount of positional shift between the first signal and the second signal;
a filter processing step of performing filter processing on one or both of the first signal and the second signal using a filter, wherein the filter is generated based on the provisional image shift amount; and
a depth deriving step of deriving the depth information on an object based on a positional shift amount between the filtered first signal and the filtered second signal, a positional shift amount between the filtered first signal and the unfiltered second signal, or a positional shift amount between the unfiltered first signal and the filtered second signal,
wherein a phase term of the filter is a function generated by multiplying a second function by a coefficient, the second function being generated based on a phase transfer function corresponding to the first pupil region or the second pupil region and the provisional image shift amount, and the coefficient being a real number greater than 0 and smaller than 1.

* * * * *